United States Patent
Singh et al.

(10) Patent No.: US 8,432,938 B2
(45) Date of Patent: Apr. 30, 2013

(54) METHOD AND SYSTEM FOR VIDEO STREAM TRANSMISSION OVER WIRELESS CHANNELS

(75) Inventors: Harkirat Singh, Santa Clara, CA (US);
Huai-Rong Shao, San Jose, CA (US);
Pengfei Xia, Mountain View, CA (US);
Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 1361 days.

(21) Appl. No.: 11/728,376

(22) Filed: Mar. 26, 2007

(65) Prior Publication Data

US 2007/0245387 A1    Oct. 18, 2007

Related U.S. Application Data (60) Provisional application No. 60/787,245, filed on Mar. 29, 2006.

(51) Int. Cl.
*H04J 3/24* (2006.01)
*H04J 3/00* (2006.01)
*H04B 1/00* (2006.01)
*G08C 25/02* (2006.01)

(52) U.S. Cl.
USPC ............. 370/474; 370/476; 455/69; 714/748

(58) Field of Classification Search .......... 370/230–231, 370/235, 252, 328, 338, 389, 473, 474, 476; 709/231; 455/41.2, 426.2, 69; 725/10, 74, 725/78; 714/18, 47, 748, 749
See application file for complete search history.

(56) References Cited

U.S. PATENT DOCUMENTS

| | | | |
|---|---|---|---|
| 6,611,537 B1 | 8/2003 | Edens et al. | |
| 7,158,473 B2 | 1/2007 | Kurobe et al. | |
| 7,315,898 B2 | 1/2008 | Kohno | |
| 7,355,976 B2 | 4/2008 | Ho et al. | |
| 7,499,462 B2 * | 3/2009 | MacMullan et al. | 370/401 |
| 7,784,076 B2 * | 8/2010 | Demircin et al. | 725/81 |
| 2004/0086268 A1 | 5/2004 | Radha et al. | |
| 2004/0131115 A1 * | 7/2004 | Burgess et al. | 375/240.01 |
| 2005/0265297 A1 * | 12/2005 | Nakajima et al. | 370/338 |
| 2006/0071807 A1 * | 4/2006 | Sadowsky | 340/825.72 |
| 2006/0209892 A1 | 9/2006 | MacMullan et al. | |
| 2007/0002892 A1 * | 1/2007 | Waxman | 370/465 |
| 2007/0234134 A1 | 10/2007 | Shao et al. | 370/338 |
| 2007/0234170 A1 | 10/2007 | Singh et al. | |

OTHER PUBLICATIONS

Hitachi, Ltd. et al., High-Definition Multimedia Interface (HDMI) Specification Version 1.2, Aug 22, 2005, pp. 1-214.

Maruhashi, K.; Kishimoto, S.; Ito, M.; Ohata, K.; Hamada, Y.; Morimoto, T.; Shimawaki, H., "Wireless uncompressed-HDTV-signal transmission system utilizing compact 60-GHz-band transmitter and receiver", Microwave Symposium Digest, 2005 IEEE MTT-S International, Jun. 12-17, 2005, pp. 1867-1870.

(Continued)

*Primary Examiner* — Hoon J Chung
*Assistant Examiner* — Redentor Pasia
(74) *Attorney, Agent, or Firm* — Kenneth L. Sherman, Esq.; Michael Zarrabian, Esq.; Sherman & Zarrabian LLP (57) ABSTRACT

A method and system for transmitting video information from a sender to a receiver over a wireless channel, is provided. Video information bits are placed into multiple data packets, and transmitted in a burst sequence from a sender to a receiver over a wireless channel in a first time frame. Transmission of each data packet is separated from transmission of the next data packet by an inter-frame time period which is shortened by a channel switching duration. Then, selected video information bits are retransmitted to from the sender to the receiver in a second time frame.

59 Claims, 10 Drawing Sheets

OTHER PUBLICATIONS

Van Veen, B.; and Buckley, K., "Beamforming: A Versatile Approach to Spatial Filtering," IEEE ASSP Magazine, vol. 5, pp. 4-24, Apr. 1988.

IEEE Std 802.15.3—2003 "B02.15.3 IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," LAN/MAN Standards Committee, IEEE Computer Society, Sep. 29, 2003, pp. 1-324, United States.

U.S. Non-final Office Action for U.S. Appl. No. 11/728,009 mailed Mar. 4, 2010.

* cited by examiner

METHOD AND SYSTEM FOR VIDEO STREAM TRANSMISSION OVER WIRELESS CHANNELS

RELATED APPLICATION

This application claims priority from U.S. Provisional Patent Application Ser. No. 60/787,245, filed on Mar. 29, 2006, incorporated herein by reference.

FIELD OF THE INVENTION

The present invention relates to transmission of video information and in particular, to transmission of uncompressed video information over wireless channels.

BACKGROUND OF THE INVENTION

With the proliferation of high quality video, an increasing number of electronics devices (e.g., consumer electronics devices) utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows the transfer of uncompressed HD signals between devices via a cable. While consumer electronics makers are beginning to offer HDMI-compatible equipment, there is not yet a suitable wireless (e.g., radio frequency (RF)) technology that is capable of transmitting uncompressed HD video signals. Wireless local area network (WLAN) and similar technologies can suffer interference issues when several devices are connected which do not have the bandwidth to carry the uncompressed HD signal, and do not provide an air interface to transmit uncompressed video over 60 GHz band. There is, therefore, a need for a method and system for transmission of uncompressed video information that addresses the above shortcomings.

BRIEF SUMMARY OF THE INVENTION

The present invention provides a method and system for transmission of video information from a sender to a receiver over a wireless channel. Video information bits are placed into multiple video data packets and transmitted in a burst sequence from the sender to the receiver over a wireless channel. Transmission of each packet is separated from transmission of the next data packet by an inter-frame time period smaller than a channel switching duration. The packets are transmitted without requiring invocation of immediate retransmissions of video information received with errors. Retransmissions are selectively performed, and are based on perceptual importance of different bits of each pixel component.

For example, most significant bits (MSBs) of a pixel component are perceptually more important than least significant bits (LSBs) because MSBs affect video quality more than LSBs. Therefore, in one embodiment, a sequence of packets including video pixel component information is transmitted in a burst from a sender to a receiver over a wireless channel in one time frame. Then in a next time frame, the MSBs of the previously transmitted video pixel component information are retransmitted from the sender to the receiver regardless of the error status of the transmitted packets received at the receiver. The receiver then uses the retransmitted MSBs selectively to replace any errors in the said transmitted packets. This improves transmission reliability of an uncompressed HD video stream.

A bitmap field in an acknowledgement (ACK) can be used by the receiver to identify to the sender those MSBs received with errors, such that the sender can selectively retransmit to the receiver a correct copy of those MSBs that were received at the receiver with errors.

These and other features, aspects and advantages of the present invention will become understood with reference to the following description, appended claims and accompanying figures.

DETAILED DESCRIPTION OF THE INVENTION

The present invention provides a method and system for transmission of video information from a sender to a receiver over a wireless channel. Video information bits are placed into multiple video data packets and transmitted in a burst sequence from the sender to the receiver over a wireless channel. Transmission of each packet is separated from transmission of the next data packet by an inter-frame time period smaller than a channel switching duration. The packets are transmitted without requiring invocation of immediate retransmissions of video information received with errors. Retransmissions are selectively performed, and are based on perceptual importance of different bits of each pixel component.

In one embodiment, the present invention provides a method and system for transmission of uncompressed video streams over wireless channels (e.g., RF) without requiring immediate retransmissions of video information received with errors. Retransmissions are selectively performed, and are based on perceptual importance of different bits of each pixel component (e.g., color component). This is because different information bits in a pixel component affect the video quality differently.

A sequence of packets of video pixel component information is transmitted in a burst from a sender to a receiver over a wireless channel in one time frame (one time period). Each data packet is separated from the next by said inter-frame time period. Then, in a next time frame (next time period), the MSBs of the previously transmitted video pixel component information are retransmitted from the sender to the receiver regardless of the error status of the transmitted packets received at the receiver. The receiver then uses the retransmitted MSBs selectively to replace any errors in the said transmitted packets. This improves transmission reliability of an uncompressed HD video stream. A bitmap field in an acknowledgment (ACK) packet or an ACK frame can be used by the receiver to identify to the sender those MSBs received with errors, such that the sender can selectively retransmit to the receiver a correct copy of those MSBs that were received at the receiver with errors.

An example implementation in a WiHD system according to the present invention is now described. A video frame is divided into multiple scan lines. Each scan line includes an integer number of pixels, wherein each pixel comprises multiple components (e.g., color, luminance). Quantization for pixel depth, or bits per component (bitplane), may be 8-bit, 10-bit, 12-bit or 16-bit values. In one example, pixel component includes either a color component (chrominance) or a luminance component of the video. Considering an 8-bit quantization, one 1080 p scan line includes 46,080 bits. And, considering 60 frames/second, one second of uncompressed video (1080 p) comprises 60×3×8×1920×1080=2.98 gigabits.

The WiHD system utilizes a 60 GHz-band mmWave technology to support a PHY (physical) layer data transmission rate of multi-Gbps, and can be used for transmitting uncompressed high-definition television (HDTV) signals wirelessly. The WiHD system includes wireless devices with multiple antennas, wherein directional beams are formed for transmitting/receiving HD data. Such a system can support a 1080 p HD format which requires a raw data rate of 2.98 Gbps (frame_size×number_of_frames_per_sec=1920×1080×3× 8*60).

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 1A:
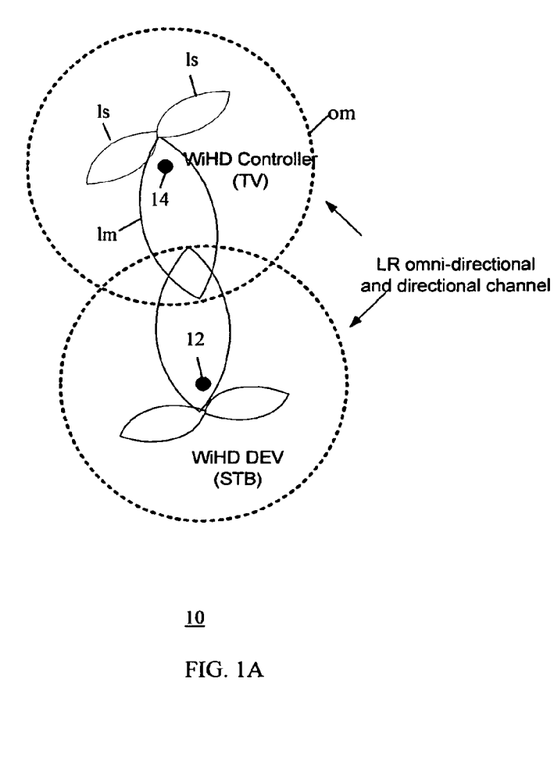
FIGS. 1A-B show an example of a Wireless High-Definition (WiHD) system comprising a network of multiple wireless devices implementing a process of uncompressed HD video transmission over a high-rate channel and an omni-directional transmission of information over a low-rate channel, according to the present invention.
Figure 1B:
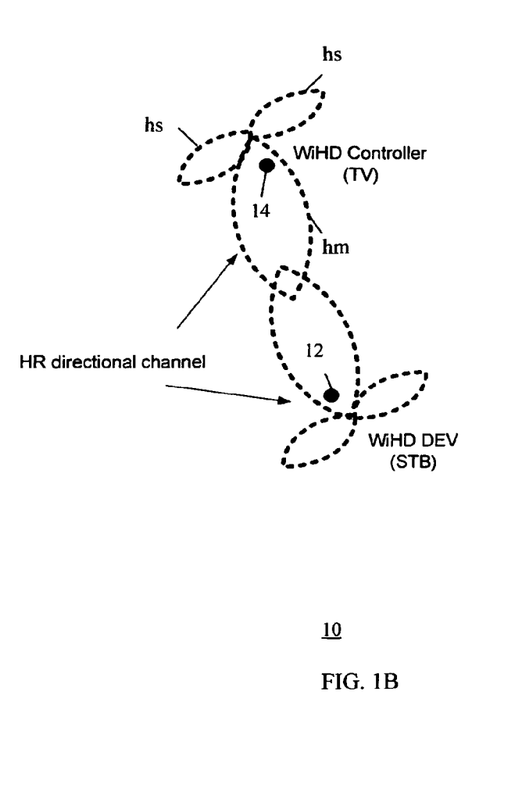

FIGS. 1A-B show an example of a WiHD system comprising a network 10 of multiple WiHD devices 12 and 14 for video packet transmission, according to the present invention. Each WiHD device utilizes two wireless channels: a symmetric low-rate (LR) control channel (FIG. 1A), and an asymmetric high-rate (HR) data channel (FIG. 1B). The LR wireless channel operates both in a directional and an omni-directional modes, which are used for transmission of control data such as beacon, association/disassociation, device discovery, ACK, beamforming, continuous beam update, compressed audio/visual (AV) data, file transfer, etc.

FIG. 1B shows a directional transmission om for the HR channel only. The asymmetric HR wireless channel is a directional (beamformed) channel which is used for transmission of uncompressed video from the WiHD sender 12 to the WiHD receiver 14. An example scenario in FIG. 1B, involves the WiHD sender 12 (e.g., set-top box (STB)), transmitting uncompressed video to the WiHD receiver 14 (e.g., HDTV), over a HR channel. The HR channel supports data rates of multi-Gbps. In this scenario, the LR channel is used to send ACKs from the WiHD receiver 14 to the WiHD sender 12 (ACKs can be transmitted over the HR channel as well). The HR channel supports a data rate of 3~4 Gbps. The packet transmission duration on the HR channel could be from 100 μs to 200 μs. Assuming a maximum data rate of 3.75 Gbps, this packet durations contains 375,000 bits (3.75*1000*100) to 750,000 bits (3.75*1000*200), respectively. FIG. 1B shows directional beams, comprising main lobes hm and side lobes hs, for the HR channel. FIG. 1A further shows omni-directional transmission om for the LR channel. FIG. 1A further shows an omni-directional transmission om, main lobes lm and side lobes ls, for the LR channel. FIG. 1B shows directional beams, comprising main lobes hm and side lobes hs, for the HR channel.

Before commencement of directional transmission on the HR channels, during a beam-searching period (e.g., period 34 in FIG. 4), the sender 12 and the receiver 14 beamform towards each other by means of beamsearch algorithms at the PHY layer. Beam-searching is also executed dynamically when the beam is lost during the HR data transmission. Beam-tracking is scheduled periodically as long as the HR data stream is active. As described in more detail below, beamsearch/beamtrack algorithms are regularly executed to continuously find high-gain beams and to mitigate the effect of link loss or beam obstruction.

Figure 2:
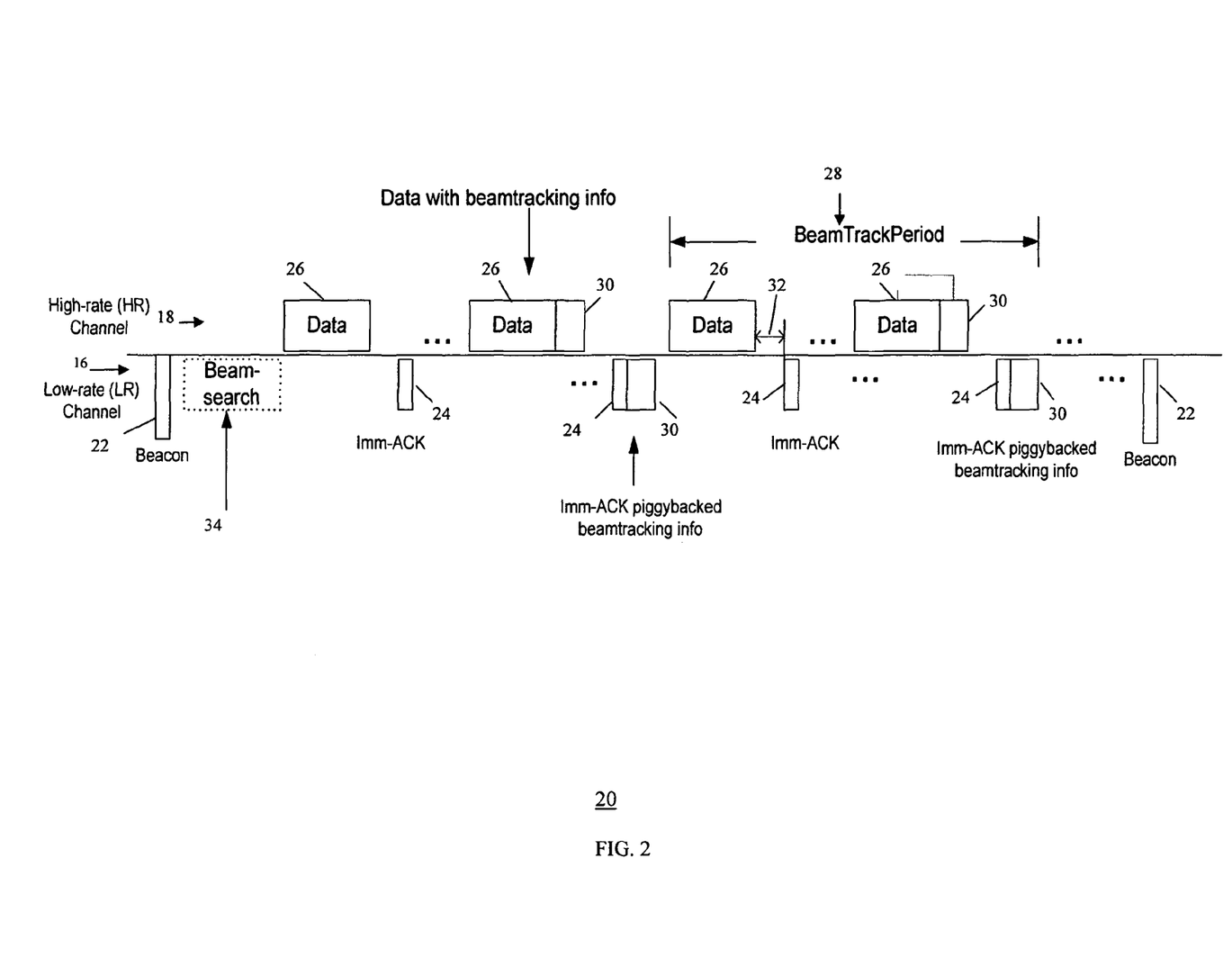
FIG. 2 shows an example of a timing diagram illustrating a data-acknowledge sequence with beamtrack and beamsearch periods.

FIG. 2 illustrates an example of a timing diagram 20 for data flow sequence from a sender 12 to a receiver 14. Time Division Duplex (TDD) scheduling is applied to a LR wireless channel 16 and a HR wireless channel 18, whereby at any one time the LR channel 16 and the HR channel 18, cannot be used in parallel for transmission. Beacon frames ("Beacon") 22 and ACK frames 24 are transmitted over the LR channel 16 in between transmission of packets of Data 26 (e.g., video, audio and control message) information over the HR channel 18. Although in this example a TDD scheme is used, as those skilled in the art will recognize, the present invention is applicable to other schemes such as a Frequency Division Duplex (FDD). As such, the present invention is not limited to the examples provided herein.

In FIG. 2, a Beacon 22 is transmitted to set timing allocations and to communicate management information for the network 10. After a Beacon 22, transmission of a data packet 26 from the sender 12 to the receiver 14 over the HR channel 18 is followed by an immediate-ACK (Imm-ACK) 24 from the receiver 14 to the sender 12, over the LR channel 16. This forms a data-ACK pair 26 and 24.

While the HR channel 18 is active, regular time periods (i.e., BeamTrackPeriod) 28 are allocated for beamtracking. Each BeamTrackPeriod 28 can be as long as the channel coherence time. In general, this can be 5~10 data packet-ACK pair transmission periods. Beamtracking information 30 is used to fine-tune the beamforming parameters at both the sender 12 and the receiver 14. This maintains the directional beams (hs) continuously optimized over the HR channel, thus, maintaining good link quality. For brevity, the beamtracking and/or beamsearching information 30 is referred to herein as beamtracking information 30. Any data packet within a BeamTrackPeriod can include beamtracking information. In one example, a last data packet within a BeamTrackPeriod includes beamtracking information.

The regular time periods BeamTrackPeriod 30 are allocated for beamtracking. Beamtracking information (i.e., beamtrack data) 30 can be piggybacked to the corresponding data-ACK pair 24 and 26, as shown by example in FIG. 2. A data packet 26 and the corresponding Imm-ACK 24 are spaced by time duration equal to a channel switching duration. In this example, the channel switching duration comprises a Medium Interface Space (MIFS) time period 32. The MIFS period 32 is sufficient for channel switching (from the HR channel 18 to the LR channel 16 and vice versa) and other processing delays. For example, the MIFS period 32 includes channel turnaround time and other processing delays such as RxTxTurnAroundTime, RxRFDelay, RxBBDelay, MACProcessingDelay, etc. (as is known to this skilled in the art).

Beamsearch 34 is performed at the start of a high data-rate transmission. Also, beamsearch is scheduled when the existing beam is not functioning well because of poor channel conditions such as multipath, interference, etc. Optionally, a BeamTrackPeriod may include a beamsearching. In general, the time required to perform beamtrack may be smaller than the beamsearch period.

Figure 3:
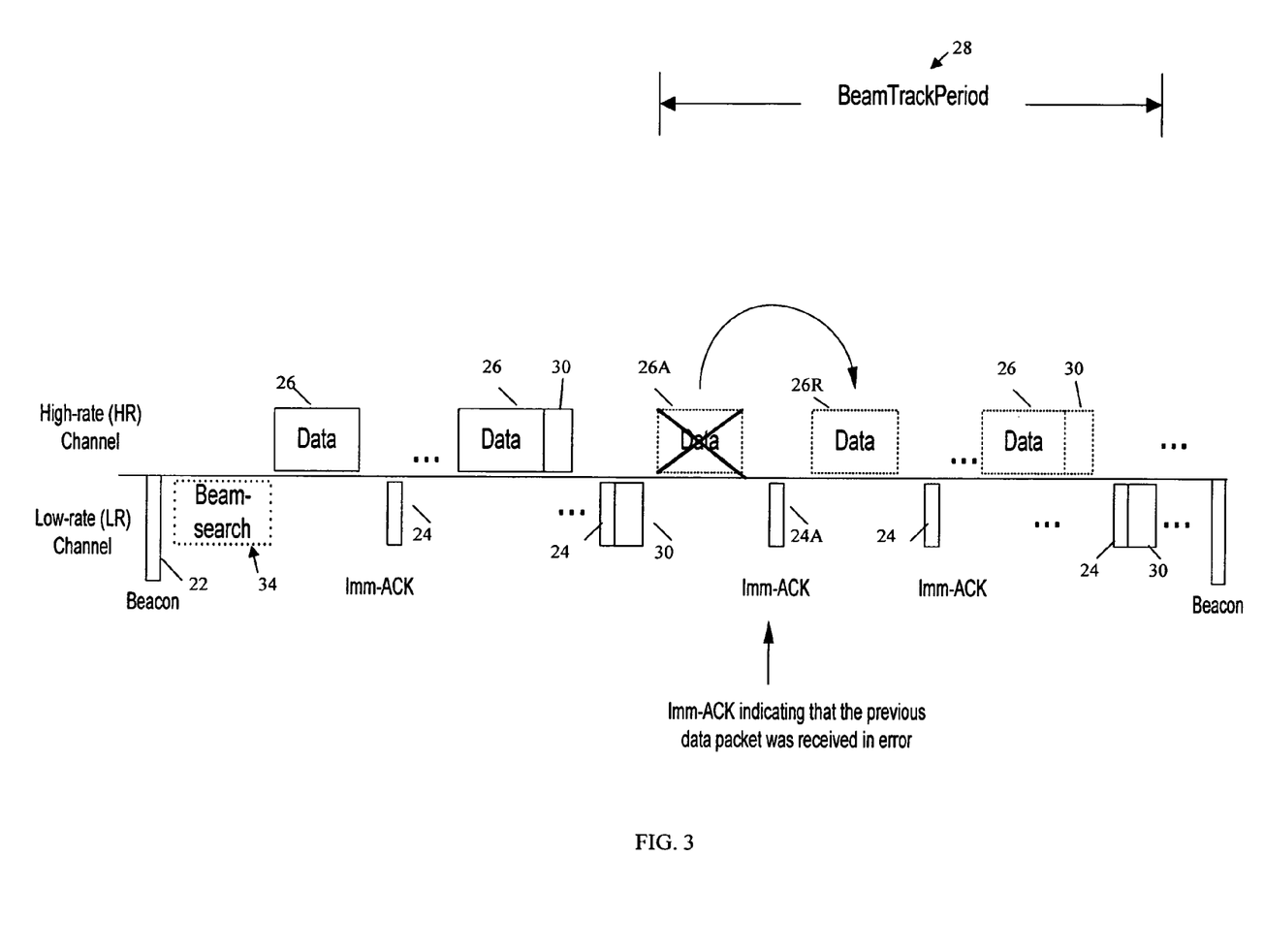
FIG. 3 shows an example of a timing diagram illustrating some drawbacks of immediate retransmission during a single BeamTrackPeriod.

According to the present invention, beamtracking updating frequency is determined based on channel coherence time. One empirical formula for the channel coherence time is 0.423/fm wherein fm=v*f/c where v is the velocity in m/s, f is the carrier frequency in Hz (60 GHz for WiHD) and c is the speed of light is 3*10$^8$ m/s. For example, if v is 3 meters per second, then coherence time is 705 μs. If one data packet 26 takes 100 microseconds (μs) to transmit over the HR channel 18, then there are about 7 data-ACK pairs within the coherence time as one BeamTrackPeriod 28. If one data packet 26 is lost, other packets 26 within the same coherence time period have a very high probability of getting lost as well. As shown by the example timeline in FIG. 3, although after sending a data packet 26A (and receiving a negative ACK 24A from the receiver), the sender retransmits the data packet 26A, the retransmitted data packet 26R and all the subsequent packets 26 within the BeamTrackPeriod 28 have a very high probability of being received with errors. Therefore, transmission of an Imm-ACK 24 after a data packet 26 does not help the packet loss, since even retransmission of a data packet after a negative ACK would be lost during said BeamTrackPeriod 28.

In the examples described below, said inter-frame time period comprise a Shortened Inter Frame Space (SIFS) time period. The SIFS period is used to separate multiple transmissions from a single transmitter, when no response transmission is expected. SIFS may include time for propagation delay and MAC processing delay.

Figure 4:
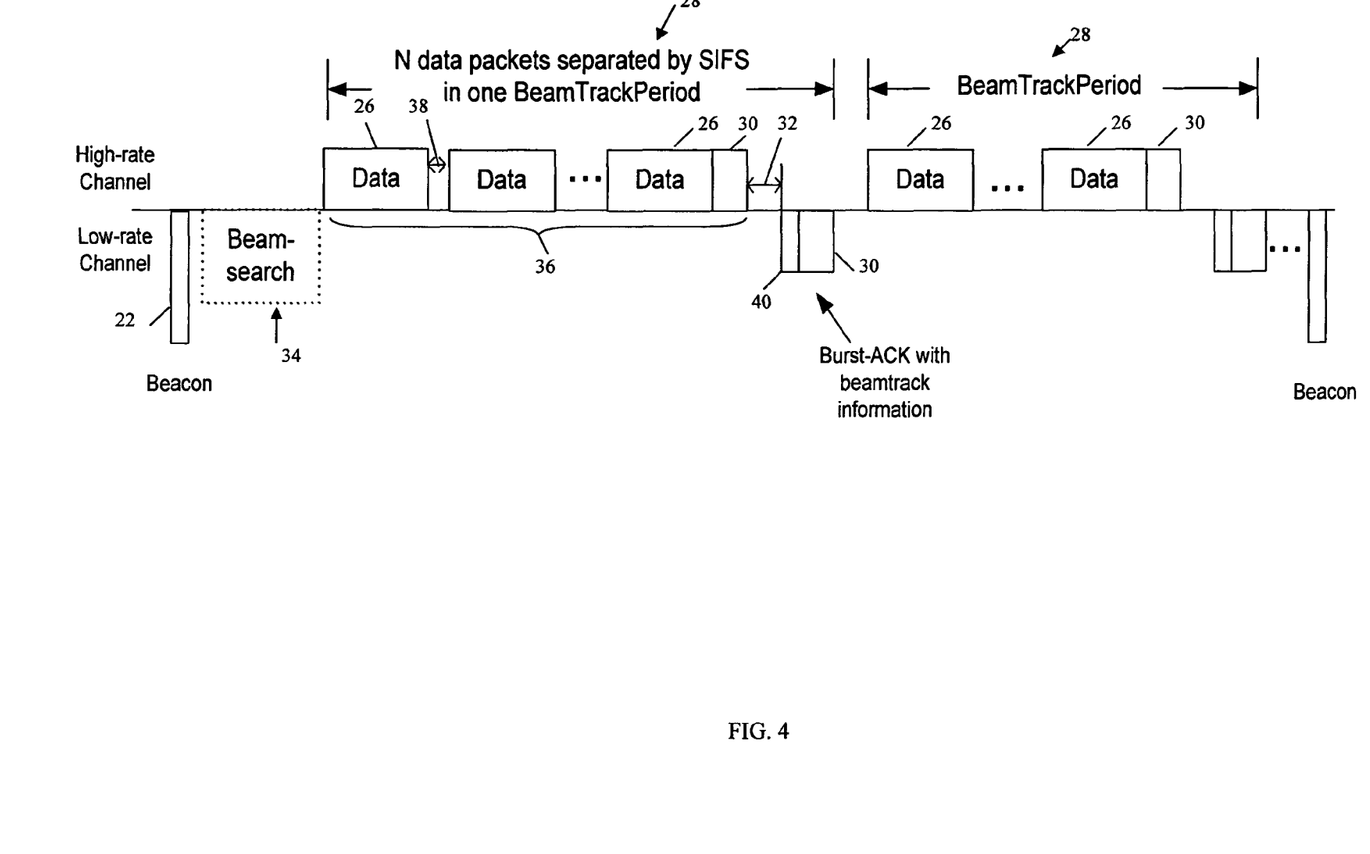
FIG. 4 shows an example of a timing diagram illustrating Shortened Inter Frame Space Bursting (SIFS Bursting) followed by a Burst-ACK, according to the present invention.

Therefore, as shown by example in FIG. 4, according to the present invention, during a BeamTrackPeriod 28, a sequence 36 of N data packets 26 separated by a SIFS (Shortened Inter Frame Space) time period 38, are transmitted from the sender 12 to the receiver 14 (i.e., SIFS-Burst sequence 36). As such, transmission of each data packet 26 is separated from transmission of the next data packet 26 by a SIFS time period 38.

The last data packet 26 in the SIFS-Burst sequence 36 carries beamtracking information 30. During the same BeamTrackPeriod 28, transmission of the SIFS-Burst sequence 36 is followed by a MIFS period 32, which is then followed by transmission of a Burst-ACK 40 with piggybacked beamtracking information 30. The MIFS period is used when a response is expected from the receiver.

An example range for the SIFS period 38 is 1~2 μs, and an example range for the MIFS period 32 is 2~10 μs. The lengths of the SIFS and MIFS periods are implementation dependent. Therefore, as those skilled in the art will recognize, other values can be utilized, so long as the SIFS period is always smaller than the MIFS period. The Burst-ACK 40 includes acknowledgments from the receiver for the N data packets 26.

Use of the SIFS-Burst sequence 36 followed by the Burst-ACK 40, reduces frequent channel switching both at the sender 12 and the receiver 14. This provides more free time periods for information transmission on the channels 16 and 18. Further, piggybacking beamtracking information 30 to the last data packet 26 in the SIFS-Burst sequence 36, avoids the need for transmission of beamtracking information separately.

Each data packet 26 may include error detection information comprising multiple Cyclic Redundancy Code (CRC) checks. In that case, sub-packetization and multiple CRCs checks per sub-packet are utilized in each data packet 26. As noted, the video information includes pixels, each having a plurality of components and each component including video information bits that are placed in sub-packets within a packet. Error detection information is determined for one or more sub-packets, and placed in the packet. Then the packet is transmitted from a transmitter to a receiver over a wireless channel, wherein the receiver uses the error detection information per sub-packet to check for transmission errors and request retransmission of erroneous video information bits based on their perceptual importance. This is achieved by sub-packetizing video information in each packet, and providing error detection/correction information including multiple CRC checks, per sub-packet in each packet. Upon receiving each packet, the receiver detects error based on the multiple CRCs checks per sub-packet, and transmits an ACK packet to the sender, indicating such errors. The sender then selectively retransmits the information in the sub-packets received in error based on perceptual importance of such information.

Further, the Burst-ACK 40 may indicate which of the MSBs of the data packets 26 transmitted in the previous BeamTrackPeriod 28 are successfully received and which are received with errors. FIG. 4 shows a SIFS-Burst sequence 36 and a Burst-ACK 40 in the same BeamTrackPeriod 28. The Burst-ACK 40 may optionally only carry beamtracking information.

Figure 5:
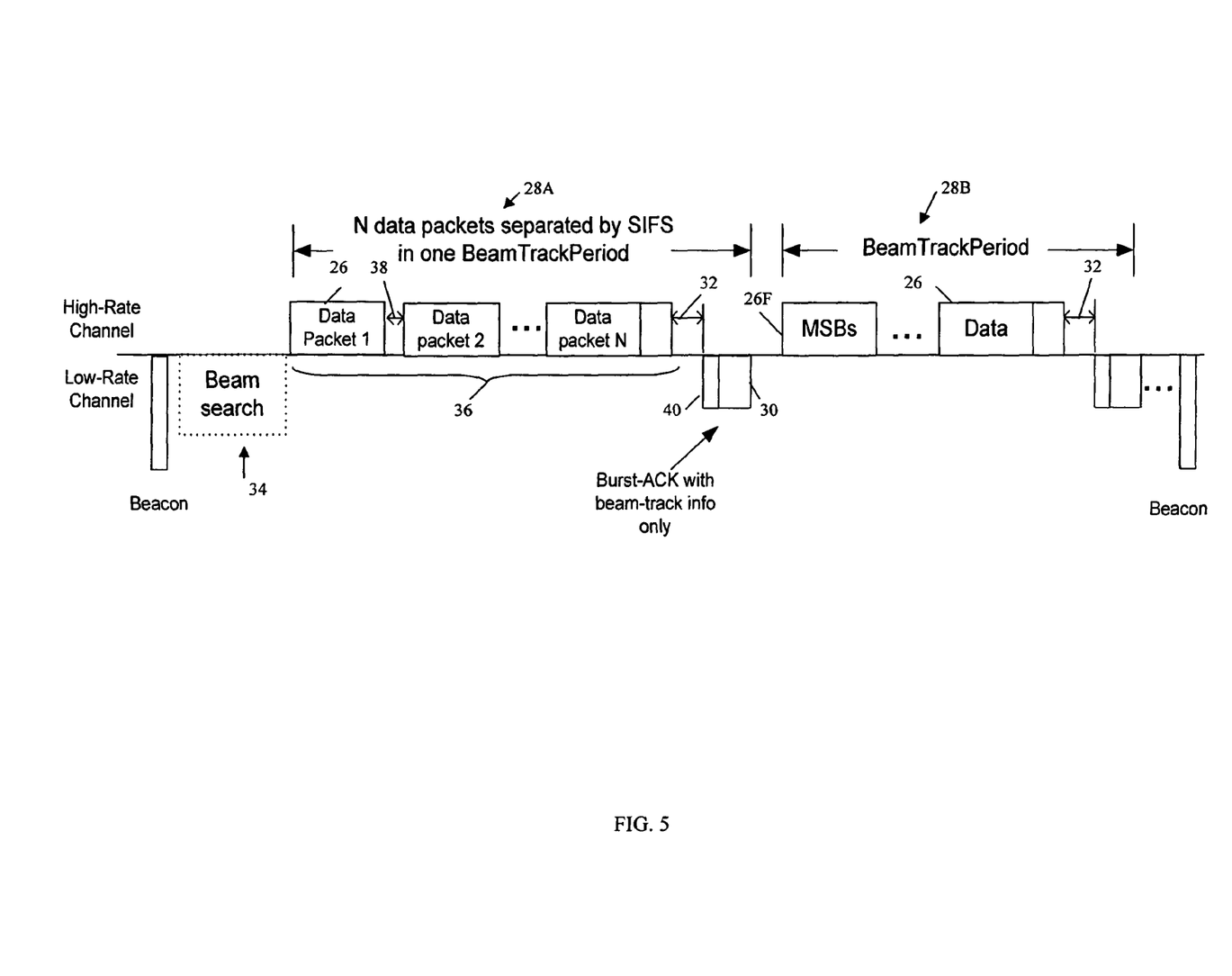
FIG. 5 shows another example of a timing diagram illustrating SIFS-Bursting followed by a Burst-ACK in a one BeamTrackPeriod, wherein the first packet in a next BeamTrackPeriod includes the MSBs of all of the data packets transmitted in the previous BeamTrackPeriod, according to the present invention.

Referring to the example timeline in FIG. 5, after transmitting a SIFS-Burst sequence 36 of N data packets (1, ..., N) to the receiver during a BeamTrackPeriod 28A, the sender receives a Burst-ACK 40 with beamtracking information 30 from the receiver. Then, at the beginning of a next BeamTrackPeriod 28B, the sender first transmits a data packet 26F that includes the MSBs of the video data transmitted in the data packets 26 in the previous BeamTrackPeriod 28A. The sender then transmits other data packets.

Figure 6:
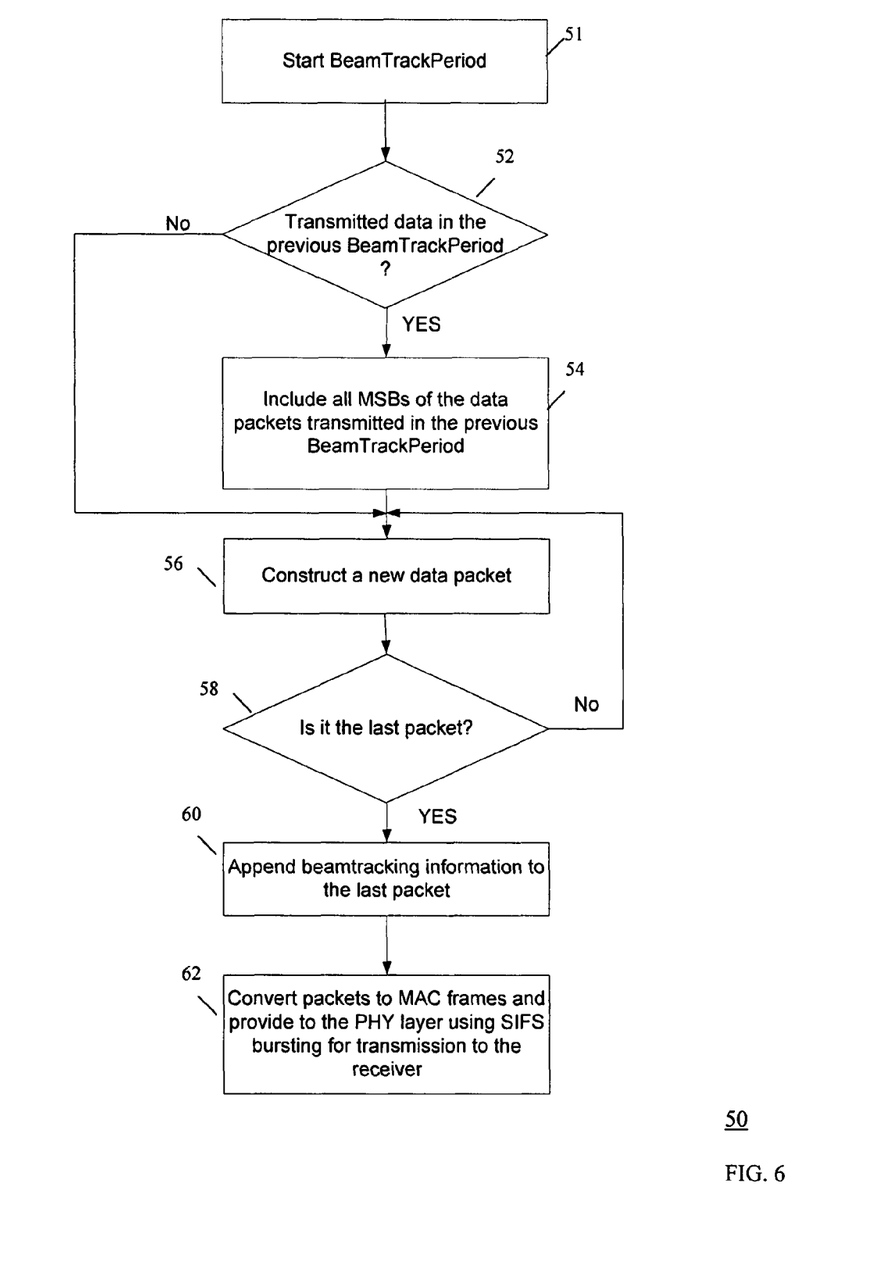
FIG. 6 shows a flowchart of a process performed by a data sender that retransmits all of the MSBs of all the data packets transmitted in the previous BeamTrackPeriod, at the beginning of the next BeamTrackPeriod as illustrated in FIG. 5, according to the present invention.

In one example, the retransmission of the MSBs (or other information of higher perceptual importance than other information bits), by the sender depends on the type of information in the Burst-ACK 40 from the receiver. If the Burst-ACK 40 does not contain any information about the MSBs (i.e., the Burst-ACK 40 carries beamtracking information only), then as noted above, during the BeamTrackPeriod 28B the sender retransmits all of the MSBs of the video data transmitted in the previous BeamTrackPeriod 28A, as shown in FIG. 5. After receiving the retransmitted MSBs in the packet 26F (i.e., a MSB packet) during the BeamTrackPeriod 28B, the receiver can recover some or all of the MSBs of the data packets in the SIFS-Burst sequence 36 transmitted during the BeamTrackPeriod 28A. FIG. 6 shows a flowchart of an example process 50 for the operation of the sender according to the timing diagram in FIG. 5, wherein the sender performs the steps of:

Step 51: Start a new BeamTrackPeriod (e.g., BeamTrack-Period 28B).

Step 52: Determine if data packets were transmitted to the receiver in the previous BeamTrackPeriod (e.g., BeamTrackPeriod 28A). If yes, go to step 54, otherwise go to step 56.

Step 54: Select all of the MSBs of the video information transmitted in the data packets during the previous BeamTrackPeriod, as the payload for a packet of video information to be transmitted to the receiver in the current BeamTrackPeriod (e.g., BeamTrackPeriod 28B).

Step 56: Construct a new data packet (e.g., packet 26F) from the selected payload of video information to be transmitted during the current BeamTrackPeriod.

Step 58: Determine if the new data packet is the last packet to be transmitted in the current BeamTrackPeriod? The BeamTrackPeriod can accommodate a fixed number of packets, wherein a counter can be used to check if the current packet is the last packet in the BeamTrackPeriod. If yes, go to step 60, otherwise go back to step 56.

Step 60: Append beamtracking information to the new packet as the last packet.

Step 62: Convert the data packets to MAC packets in a MAC layer of the sender and provide to the PHY layer of the sender for transmission to the receiver as a SIFS-Burst sequence 36, over the HR channel 18.

Figure 7:
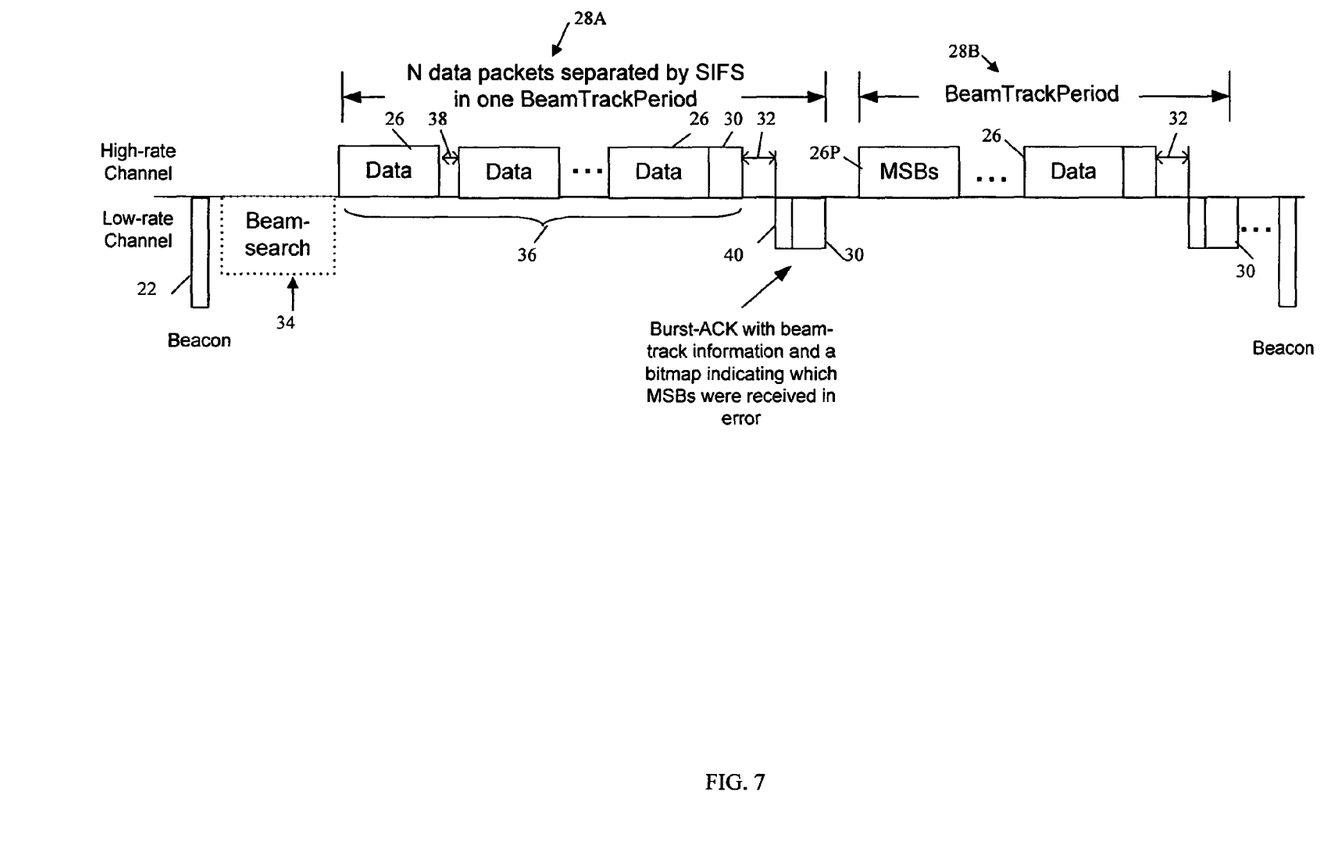
FIG. 7 shows another example of a timing diagram illustrating SIFS-Bursting followed by a Burst-ACK in a one BeamTrackPeriod, wherein the first packet in a next BeamTrackPeriod selectively includes the MSBs based on a bitmap in the Burst-ACK, according to the present invention.
Figure 8:
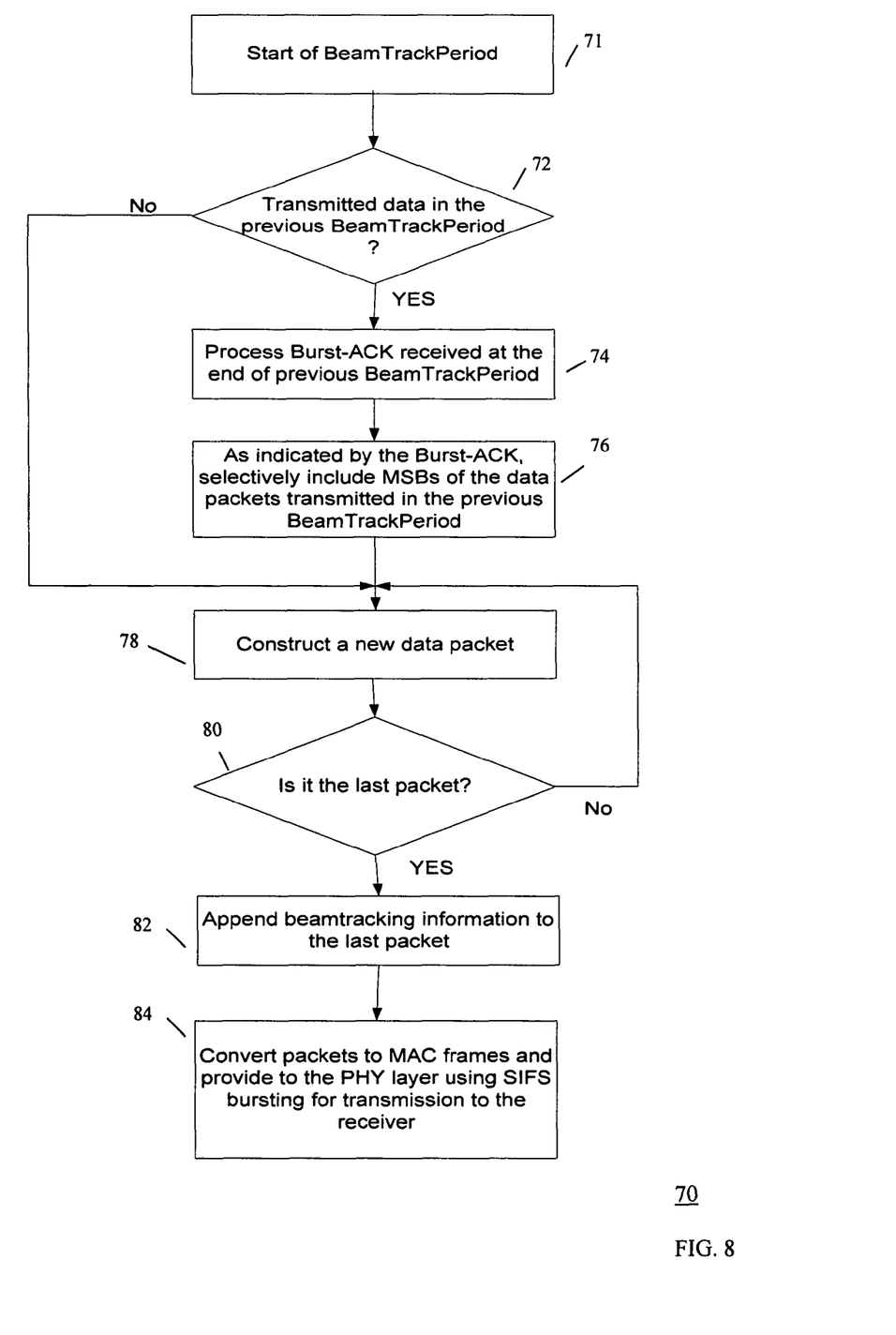
FIG. 8 shows a flowchart of an example process performed by a data sender that retransmits the selected MSBs of the data packets transmitted in the previous BeamTrackPeriod based on the Burst-ACK, at the beginning of the next BeamTrackPeriod as illustrated in FIG. 7, according to the present invention.

On the other hand, if as shown by the example timeline in FIG. 7, the Burst-ACK 40 for the SIFS-Burst sequence 36 transmitted to the receiver during the BeamTrackPeriod 28A identifies the MSBs received at the receiver with errors, then at the beginning of the BeamTrackPeriod 28B the sender transmits a data packet 26P that includes the MSBs which the Burst-ACK 40 indicated as received with errors at the receiver. Using the retransmitted MSBs in the data packet 26P during the BeamTrackPeriod 28B, the receiver can selectively recover those MSBs of the data packets in the SIFS-Burst sequence 36 transmitted during the BeamTrack-Period 28A. FIG. 8 shows a flowchart of an example process 70 for operation of the sender according to the timing diagram in FIG. 7, wherein the sender performs the steps of:

Step 71: Start a new BeamTrackPeriod (e.g., BeamTrack-Period 28B).

Step 72: Determine if the data packets were transmitted to the receiver in the previous BeamTrackPeriod (e.g., BeamTrackPeriod 28A)? If yes, go to step 74, otherwise go to step 78.

Step 74: Process the Burst-ACK received from the receiver at the end of the previous BeamTrackPeriod to determine the MSBs received at the receiver with errors.

Step 76: Select the MSBs indicated by the Burst-ACK, for the video information transmitted in the data packets during the previous BeamTrackPeriod, as the payload for a packet of video information to be transmitted to the receiver in the current BeamTrackPeriod (e.g., BeamTrackPeriod 28B).

Step 78: Construct a new data packet (e.g., packet 26P) from the selected payload of video information to be transmitted during the current BeamTrackPeriod.

Step 80: Determine if the new data packet is the last packet to be transmitted in the current BeamTrackPeriod? If yes, go to step 82, otherwise go back to step 78.

Step 82: Append beamtracking information to the new packet as the last packet.

Step 84: Convert the data packets to the MAC packets in a MAC layer of the sender, and provide to the PHY layer of the sender for transmission to the receiver as a SIFS-Burst sequence 36, over the HR channel 18.

Figure 9:
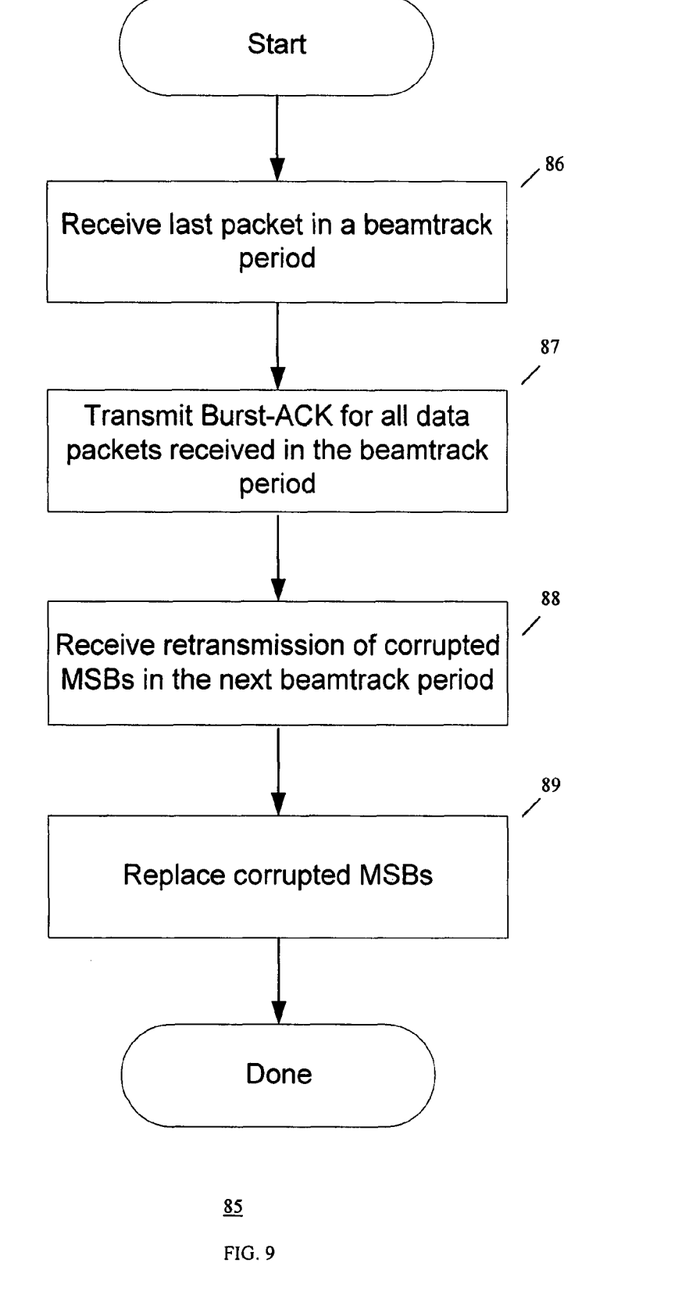
FIG. 9 shows a flowchart of an example process performed by a data receiver, according to the present invention.

FIG. 9 shows a flowchart of an example process 85 for the operation of the receiver according to the timing diagram in FIG. 7, wherein the receiver performs the steps of:

Step 86: Receive a last packet in a beamtrack period.

Step 87: Transmit a Burst-ACK for all data packets received in the beamtrack period.

Step 88: Receive retransmission of any corrupted MSBs in the next beamtrack period.

Step 89: Replace any corrupted MSBs with the retransmitted MSBs for display.

Figure 10:
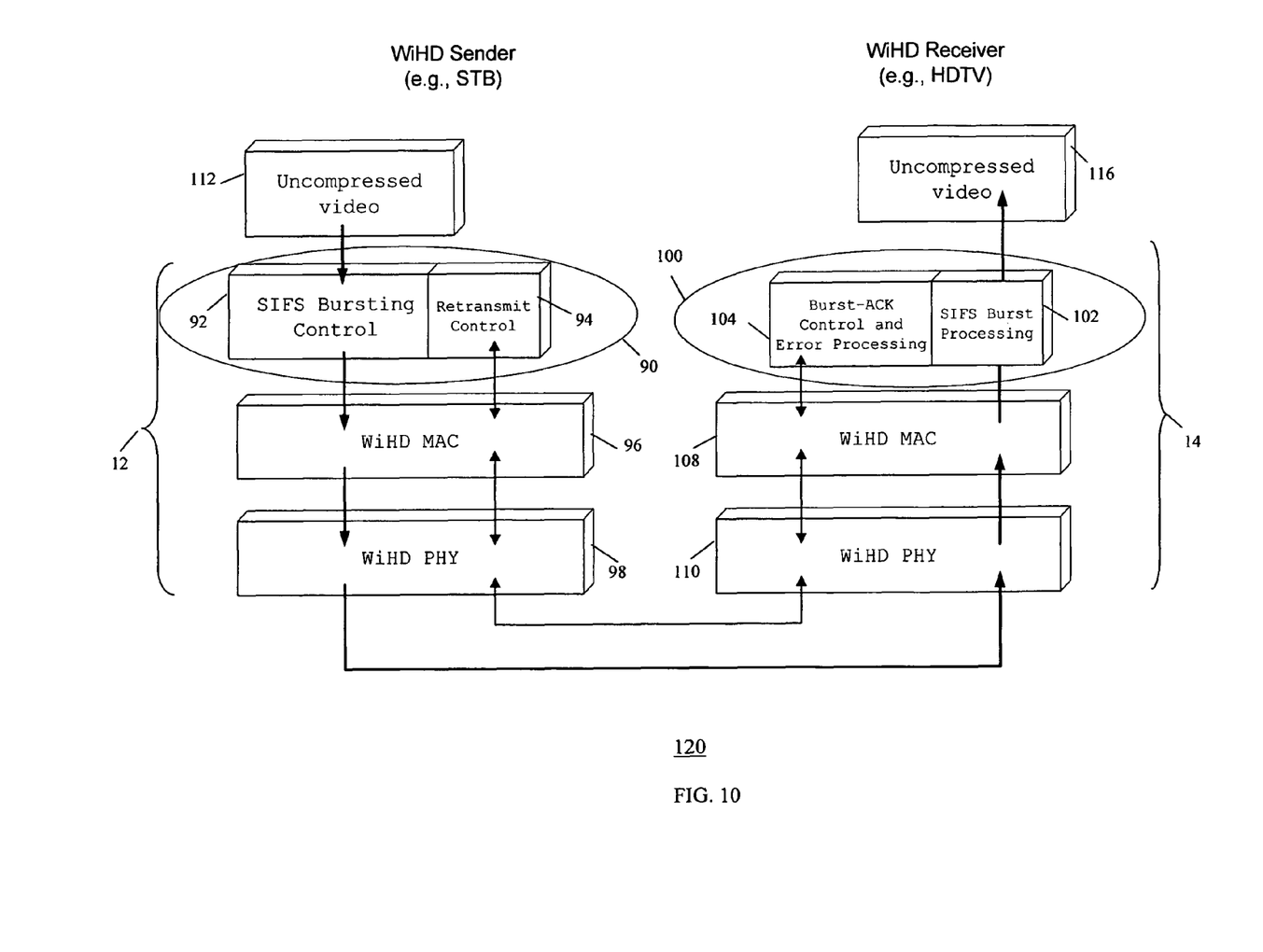
FIG. 10 shows an example of a functional block diagram of a sender device and a receiver device in a communication system, according to the present invention.

FIG. 10 shows a more detailed functional block diagram of the WiHD sender 12 and the WiHD receiver 14, forming a communication system 120 implementing a WiHD video data transmission process, according to an embodiment of the present invention. The WiHD sender 12 comprises a video information transmit controller 90 which includes a SIFS Bursting Control module 92 and a Retransmit Control module 94. The WiHD sender 12 further comprises a MAC layer (WiHD MAC) 96 and a PHY layer (WiHD PHY) 98. The WiHD receiver 14 comprises a video information receive controller 100 which includes a SIFS Burst Processing module 102 and a Burst-ACK Control and Error Processing module 104. The WiHD receiver 14 further comprises a MAC layer (WiHD MAC) 108 and a PHY layer (WiHD PHY) 110.

The WiHD sender 12 inputs video information such as a frame of uncompressed video information 112. The SIFS Bursting Control module 92 performs SIFS bursting. The module 92 implements a packetizer for packetizing at least a portion of the video information 112 into N data packets 26 and provides the N data packets 26 to the WiHD MAC 96 which converts the data packets 26 into MAC packets. The WiHD MAC 96 then provides the MAC packets to the WiHD PHY 98 to transmit to the sender for transmission to the receiver as a SIFS-Burst sequence 36 during a BeamTrack-Period, over the HR channel 18, as described above.

The WiHD PHY 110 of the WiHD receiver 14 receives the transmitted information and provides that information to the WiHD MAC 108. The WiHD PHY 110 and the WiHD MAC 108 of the WiHD receiver 14 perform the reverse steps of the WiHD PHY 98 and the WiHD MAC 96, respectively, of the WiHD sender 12.

The WiHD MAC 108 provides the received data packets to the SIFS Burst Processing module 102 for depacketizing, and extracting packet information from the received data packets. The Burst-ACK Control and Error Processing module 104 performs error detection on the extracted packet information (e.g., using error detection information such as a CRC check placed in the packets by the transmitter). Based on the error detection results, the Burst-ACK Control and Error Processing module 104 prepares a Burst-ACK packet 40 and transmits to the WiHD sender 12 as described above. The Retransmit Control module 94 of the WiHD sender 12 performs retransmission of all or some of the MSBs of the video information in the previously transmitted packets, to the WiHD receiver 14 as described above. Then, the Burst-ACK Control and Error Processing module 104 at the WiHD receiver 14 can use the retransmitted MSBs for error correction, as necessary, to generate uncompressed video information 116 for consumption.

As such, the WiHD sender 12 transmits N packets of video information to the WiHD receiver 14 over a wireless channel using SIFS bursting in a time frame (e.g., BeamTrackPeriod 28A). Then, during a next time frame (e.g., BeamTrackPeriod 28B), the WiHD sender 12 retransmits all or some of the MSBs of the video information in the previously transmitted packets to the WiHD receiver 14, based on the acknowledgement information (e.g., Burst-ACK) received from the WiHD receiver 14. In another example, the system in FIG. 10 can also be modified by implementing the functional modules 90, 100 related to bursting within the MAC layers 96, 108, respectively, of the sender and/or the receiver.

Transmission of uncompressed video transmission using SIFS bursting (i.e., SIFS-Burst sequence followed by the Burst-ACK), according to the present invention, reduces the time to transmit video data over wireless channels. After transmitting packets of video information from a sender to a receiver over a wireless channel using SIFS bursting in one time frame, then during the next frame all or some of the MSBs of the video information in the previously transmitted packets are retransmitted from the sender to the receiver based on the type of acknowledgement information received from the sender. This improves transmission reliability of an uncompressed HD video stream. Assuming a pixel component contains 8-bits, approximately 12.5% additional bandwidth is used to support transmission of all the MSBs. It also allows effective utilization of surplus bandwidth for transmission of the MSBs. This improves the reliability of uncompressed video transmission over wireless channels without invoking immediate retransmissions of video information received with errors.

In the above description, the MSBs have been used as perceptually more important bits, and the LSBs have been used as perceptually less important bits, for description of the invention. As those skilled in the art will recognize, the present invention is applicable to other examples of perceptually more important bits, and perceptually less important bits. For example, for an N=8 bit pixel component with bits $B_7, \ldots, B_0$, the bits can be mapped into: (1) perceptually more important bits $B_7, B_6, B_5$, (2) perceptually important bits $B_4$, $B_3$, and (3) perceptually less important bits $B_2, B_1, B_0$. As such the bitplane of a pixel component can be mapped into multiple levels of perceptual importance for application of the present invention.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of transmitting video information from a sender to a receiver over a wireless channel, comprising:
    inputting video information bits at the sender; packetizing the video information bits into multiple data packets;
    appending beamtracking information to a last data packet of the multiple data packets, wherein the beamtracking information comprises information for tuning beamforming parameters at both the sender and the receiver in order to maintain continuous optimization of directional beams from the sender to the receiver over a high-rate data channel;
    transmitting the multiple data packets in a burst sequence from the sender to the receiver over the wireless channel in a first time frame, wherein transmission of each data packet is separated from transmission of the next data packet by an inter-frame time period which is shortened by a channel switching duration comprising a time period including time for channel switching from the high-rate data channel to a low-rate control channel and associated processing delays; and
    retransmitting selected video information bits from the sender to the receiver in a second time frame.

2. The method of claim 1 further comprising:
    receiving the multiple data packets at the receiver;
    generating a burst acknowledgment for the multiple data packets;
    transmitting the burst acknowledgment from the receiver to the sender over the wireless channel; and
    receiving the burst acknowledgment (Burst-ACK) from the receiver for the multiple data packets.

3. The method of claim 2, wherein the last data packet in the multiple data packets comprises the Burst-Ack appended with the beamtracking information.

4. The method of claim 3 wherein the last data packet is transmitted in a current beamtracking time period.

5. The method of claim 1 further includes receiving a burst acknowledgment during said first time frame.

6. The method of claim 5 wherein receiving said burst acknowledgment further includes receiving said burst acknowledgment during said first time frame, a channel switching duration after transmitting the multiple data packets.

7. The method of claim 6 wherein the inter-frame time period comprises a Shortened Inter Frame Space (SIFS) time period and the channel switching duration comprises a Medium Interface Space (MIFS) time period.

8. The method of claim 7 wherein the MIFS time period is longer than the SIFS time period.

9. The method of claim 8, wherein the SIFS period is used to separate multiple transmissions from a single transmitter when no transmission is expected, and the MIFS period is used when a response is expected from the receiver.

10. The method of claim 7 further comprising: in the second time frame, retransmitting the selected video information bits of the multiple data packets transmitted during the first time frame.

11. The method of claim 10 wherein retransmitting the selected video information bits further includes retransmitting selected video information bits based on perceptual importance of the video information bits based on type of information in said burst acknowledgment from the receiver.

12. The method of claim 11 wherein transmitting the multiple data packets further includes transmitting the multiple data packets from the sender to the receiver over a high-rate wireless channel.

13. The method of claim 12 further includes the receiver transmitting said burst acknowledgment to the sender over the wireless channel.

14. The method of claim 13 wherein:
transmitting the multiple data packets from the sender to the receiver further comprises transmitting the multiple data packets from the sender to the receiver by the directional transmission beams over the high-rate data channel; and
the receiver transmitting said burst acknowledgment to the sender over the low-rate control channel further includes the receiver transmitting the burst acknowledgement to the sender by the directional transmission beams over the low-rate control channel.

15. The method of claim 11, wherein the type of information in said Burst-ACK from the receiver comprises one of beamtracking information and information of higher perceptual importance.

16. The method of claim 11, wherein the burst acknowledgment identifies most significant
bits (MSBs) of data packets received by the receiver with errors.

17. The method of claim 16, wherein at a beginning of a beam track period, the sender transmits a data packet that includes the MSBs received with errors at the receiver.

18. The method of claim 10 further comprising:
the receiver utilizing the retransmitted video information bits to replace video information bits in the multiple data packets that were received with errors.

19. The method of claim 10 wherein the video information bits represent video pixel components, such that retransmitting the selected video information bits in the second time frame further includes retransmitting perceptually important video information bits of the video pixel components within the multiple data packets transmitted during the first time frame from the sender to the receiver.

20. The method of claim 19 wherein retransmitting the selected video information bits in said second time frame further includes retransmitting all of the most significant bits of the video pixel components in all of the multiple data packets transmitted during the first time frame from the sender to the receiver.

21. The method of claim 19 wherein:
generating said burst acknowledgment for the multiple data packets further includes: detecting the most significant bits in the multiple data packets transmitted during the first time frame and received by the receiver with errors, and generating said burst acknowledgment to include information identifying the most significant bits with errors; and
retransmitting the selected video information bits during the second time frame further includes retransmitting a correct copy of those most significant bits of the video pixel components in said multiple data packets that are identified by said burst acknowledgment as received with errors.

22. The method of claim 1, wherein the processing delays comprising media access control (MAC) layer processing delays.

23. The method of claim 22, wherein the processing delays comprising channel turnaround time.

24. The method of claim 1, wherein each data packet and a corresponding immediate-ACK (Imm-ACK) are spaced by the time period for channel switching from the high-rate data channel to the low-rate control channel including associated processing delays.

25. The method of claim 1, wherein appending the beamtracking information to the last data packet of the multiple data packets avoids separately transmitting the beamtracking information.

26. The method of claim 25, wherein the beamtracking information is only appended to the last data packet of the multiple data packets during the burst sequence.

27. The method of claim 1, wherein the beamtracking information further comprises beam searching information.

28. A communication system for transmission of video information over wireless channels, comprising:
a wireless transmitter including:
a packetizer that places video information bits into multiple data packets and appends beamtracking information to a last data packet of the multiple data packets;
a communication controller that transmits the multiple data packets in a burst sequence over a high-rate wireless channel via directional transmission beams during a first time frame, wherein transmission of each data packet is separated from transmission of the next data packet by an inter-frame time period shortened by a channel switching duration comprising a time period including time for channel switching from a high-rate data channel to a low-rate control channel and associated processing delays;
a retransmitter configured such that in a second time frame, the retransmitter retransmits selected video information bits from the transmitter to a receiver;
the receiver including:
a depacketizer configured for extracting the video information bits from the multiple packets;
an acknowledgement module configured to generate acknowledgments for the multiple data packets;
a communication module configured to transmit the acknowledgments in a burst sequence from the receiver to the transmitter over a wireless channel during a beamtracking time period,
wherein the beamtracking information comprises information for tuning beamforming parameters at both the wireless transmitter and the wireless receiver in order to maintain continuous optimization of directional beams from the sender to the receiver over the high-rate data channel.

29. The system of claim 28 wherein:
the first time frame comprises a first beamtracking time period, and the second time frame comprises a second beamtracking time period;
the communication module of the receiver is further configured to transmit the Burst-ACK during said first beamtracking time period for receipt at the transmitter within the channel switching duration after transmission of the multiple data packets.

30. The system of claim 29 wherein the retransmitter configured such that in the second beamtracking time period, the retransmitter retransmits the selected video information bits of the multiple data packets transmitted during the first beamtracking time period from the transmitter to the receiver.

31. The system of claim 30 wherein the retransmitter is configured to retransmit the selected video information bits based on perceptual importance of the video information bits.

32. The system of claim 30 wherein the video information bits represent video pixel components and the selected video information bits include perceptually important information bits of the multiple data packets transmitted during the first beamtracking time period from the transmitter to the receiver.

33. The system of claim 32 wherein the selected video information bits include the most significant bits of the video pixel components in all of the multiple data packets transmitted during the first beamtracking time period from the transmitter to the receiver.

34. The system of claim 32, wherein:
the receiver further includes an error detection module configured to detect the perceptually important bits in the multiple data packets transmitted during the first beamtracking time period and received by the receiver with errors, such that the acknowledgment module is further configured to generate a burst acknowledgment to include information identifying the perceptually important bits received with errors; and
the retransmitter is further configured to retransmit a correct copy of perceptually important information bits identified by the burst acknowledgment as received with errors, in said second beamtracking time period.

35. The system of claim 30 wherein the receiver further includes an error detection module configured for utilizing the retransmitted video information bits to recover video information bits in the multiple data packets that were received with errors.

36. The system of claim 29 wherein the last data packet is transmitted in the first beamtracking time period.

37. The system of claim 28, wherein the last data packet in the multiple data packets comprises a Burst-Ack appended with the beamtracking information.

38. The system of claim 28 wherein the video information comprises uncompressed video information.

39. The system of claim 38 wherein the video information comprises uncompressed high-definition video information.

40. The system of claim 28 wherein the inter-frame time period comprises a SIFS time period and the channel switching duration comprises a MIFS time period.

41. A transmitter for the transmitting of video information to a receiver over wireless channels, comprising:
a packetizer that places video information bits into multiple data packets and appends beamtracking information to a last data packet of the multiple data packets, wherein the beamtracking information comprises information for tuning beamforming parameters at both the transmitter and the receiver in order to maintain continuous optimization of directional beams from the sender to the receiver over a high-rate data channel;
a communication controller configured to transmit the multiple data packets in a burst sequence over a high-rate wireless channel via directional transmission beams during a first time frame, wherein transmission of each data packet is separated from transmission of the next data packet by an inter-frame time period shortened by a channel switching duration comprising a time period including time for channel switching from the high-rate data channel to a low-rate control channel and associated processing delays; and
a retransmitter configured such that in a second time frame, the retransmitter retransmits selected video information bits of the multiple data packets transmitted during a last beamtracking time period from the transmitter to the receiver.

42. The transmitter of claim 41 wherein the first time frame comprises a first beamtracking time period, and the second time frame comprises a second beamtracking time period.

43. The transmitter of claim 42 wherein the retransmitter is configured to retransmit the selected video information bits based on perceptual importance of the video information bits.

44. The transmitter of claim 43 wherein the video information bits represent video pixel components and the selected video information bits include perceptually important information bits of the multiple data packets transmitted during the first beamtracking time period from the transmitter to the receiver.

45. The transmitter of claim 44 wherein the selected video information bits include the most significant bits of the video pixel components in all of the multiple data packets transmitted during the first beamtracking time period from the transmitter to the receiver.

46. The transmitter of claim 44 wherein the retransmitter is further configured to retransmit a correct copy of perceptually important information bits identified by a burst acknowledgment from the receiver as received with errors, in said second beamtracking time period.

47. The transmitter of claim 43 wherein the burst acknowledgment further includes beamtracking information.

48. The transmitter of claim 41 wherein a data packet in the multiple data packets further includes beamtracking information.

49. The transmitter of claim 41 wherein the video information comprises uncompressed high-definition video information.

50. The transmitter of claim 41 wherein the inter-frame time period comprises a SIFS time period and the channel switching duration comprises a MIFS time period.

51. A receiver for receiving video information from a transmitter over wireless channels, the video information including a burst of multiple video packets including information bits, the receiver comprising:
a depacketizer configured for extracting the video information bits from the multiple packets received during a first time frame and extracting beamtracking information from a last data packet of the multiple data packets, wherein the beamtracking information comprises information for tuning beamforming parameters at both the transmitter and the receiver in order to maintain continuous optimization of directional beams from the receiver to the transmitter over a high-rate data channel;
an acknowledgement module configured to generate acknowledgments for the multiple data packets; and
a communication module configured to transmit the acknowledgments in a burst sequence to the transmitter over a wireless channel during said first time frame, wherein:
said first time frame comprises a beamtracking period; and
transmission of each data packet is separated from transmission of a next data packet by an inter-frame time period shortened by a channel switching duration comprising a time period including time for channel switching from the high-rate data channel to a low-rate control channel and associated processing delays.

52. The receiver of claim 51 wherein the inter-frame time period comprises a SIFS time period and the channel-switching duration comprises a MIFS time period.

53. The receiver of claim 51 wherein the communication module is further configured to transmit the Burst-ACK during said first beamtracking time period for receipt at the transmitter within a channel switching duration after transmission of the multiple data packets.

54. The receiver of claim 53 further including an error detection module configured to detect the perceptually important bits in the multiple data packets transmitted during the first beamtracking time period and received by the receiver with errors, such that the acknowledgment module is further configured to generate a Burst-ACK to include information identifying the perceptually important bits received with errors for retransmission by the transmitter.

55. The receiver of claim 54 wherein the communication module is further configured to receive in a second beamtracking time period a retransmission of selected video information bits of the multiple data packets transmitted during the first beamtracking time period.

56. The receiver of claim 55 wherein the selected video information bits are of higher perceptual importance than other video information bits.

57. The receiver of claim 53 further including an error detection module configured for utilizing retransmitted video information bits to recover video information bits in the multiple data packets that were received with errors.

58. The receiver of claim 51 wherein the video information comprises uncompressed video information.

59. The receiver of claim 51 wherein the video information comprises uncompressed high-definition video information.

* * * * *